United States Patent [19]

Ortiz et al.

[11] Patent Number: 5,601,254
[45] Date of Patent: Feb. 11, 1997

[54] SINGLE SIDED BACKBONE STRUT FOR AIR DATA SENSOR

[75] Inventors: Rafael A. Ortiz, Minneapolis; Theodore P. Dale, Savage, both of Minn.

[73] Assignee: Rosemount Aerospace Inc., Burnsville, Minn.

[21] Appl. No.: 330,990

[22] Filed: Oct. 28, 1994

[51] Int. Cl.⁶ .................................................. B64D 47/00
[52] U.S. Cl. ........................ 244/1 R; 244/130; 73/861.65; 73/180
[58] Field of Search ........................... 244/1 R, 130, 244/134 D; 416/90, 96 A; 73/180, 182, 861.65, 861.66, 861.67, 861.68, 861.69

[56] References Cited

U.S. PATENT DOCUMENTS

| D. 345,709 | 4/1994 | Hedberg et al. | D10/96 |
|---|---|---|---|
| D. 345,710 | 4/1994 | Hedberg et al. | D10/96 |
| 1,810,907 | 6/1931 | Cole | 73/861.85 |
| 2,101,165 | 12/1937 | Cole et al. | 73/861.65 |
| 2,358,367 | 9/1944 | Meerbeke | 73/861.65 |
| 2,641,439 | 6/1953 | Williams | 416/90 |
| 2,695,146 | 11/1954 | De Witt | 244/134 D |
| 3,030,807 | 4/1962 | Scadron | 73/212 |
| 3,482,445 | 12/1969 | DeLeo et al. | 73/182 |
| 4,249,291 | 2/1981 | Grondahl et al. | 416/96 D |
| 4,275,603 | 6/1981 | Kalocsay | 73/861.68 |
| 4,378,696 | 4/1983 | DeLeo et al. | 73/180 |
| 4,378,697 | 4/1983 | DeLeo et al. | 73/182 |
| 4,718,273 | 1/1988 | McCormack | 73/180 |
| 5,025,661 | 6/1991 | McCormack | 73/180 |
| 5,043,559 | 8/1991 | Byles | 244/134 D |
| 5,099,686 | 3/1992 | Kohler | 73/182 |
| 5,331,849 | 7/1994 | Hedberg et al. | 73/182 |

FOREIGN PATENT DOCUMENTS

| 857427 | 12/1960 | United Kingdom . |
|---|---|---|
| 1181216 | 2/1970 | United Kingdom . |
| WO95/08122 | 3/1995 | WIPO . |

*Primary Examiner*—Galen L. Barefoot
*Attorney, Agent, or Firm*—Westman, Champlin & Kelly, P.A.

[57] ABSTRACT

An air data sensor strut made of a single block of material has one side finished in a smooth contour, and has grooves in an opposite side of the strut for receiving pressure carrying conduits or other elongated members such as a heater. The heater and conduits are secured in place with a filling of potting material and the open sides of the grooves are finished after filling so that the desired contour is provided for the opposite side of the strut. The strut has a thin cross-section because of the elimination of hollow interior spaces formed by spaced walls.

21 Claims, 2 Drawing Sheets

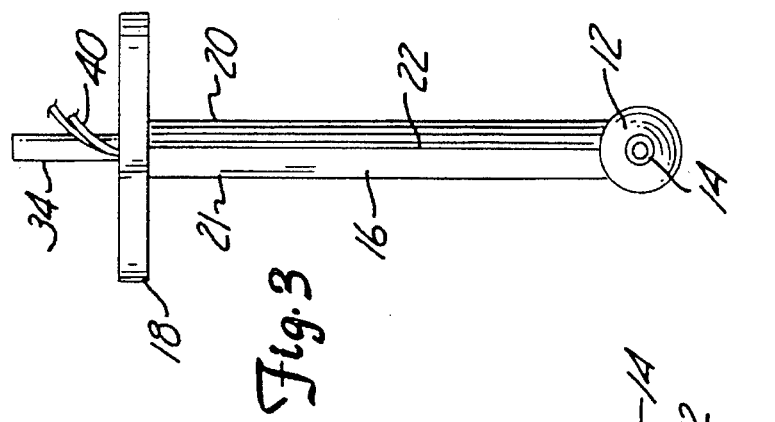
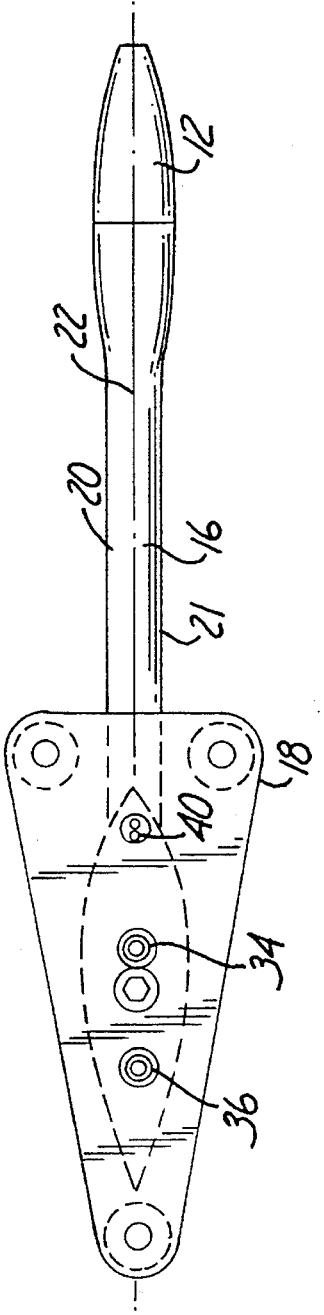
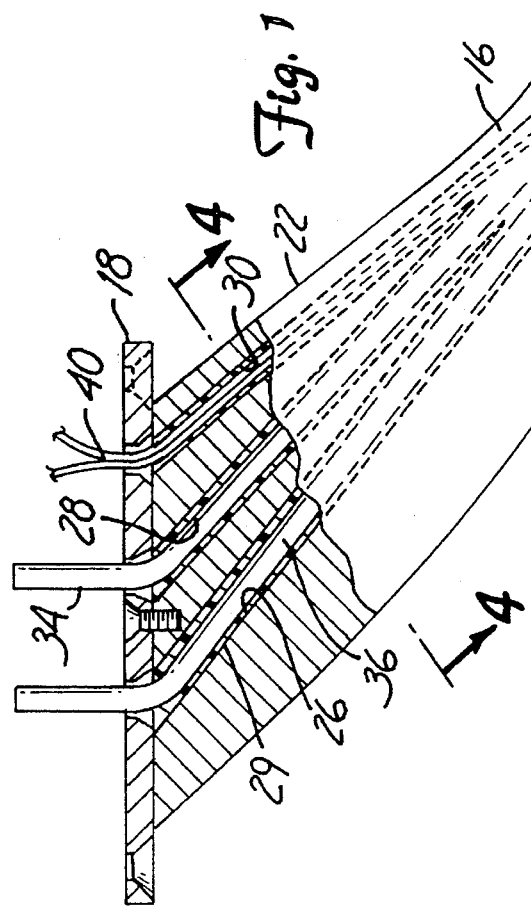
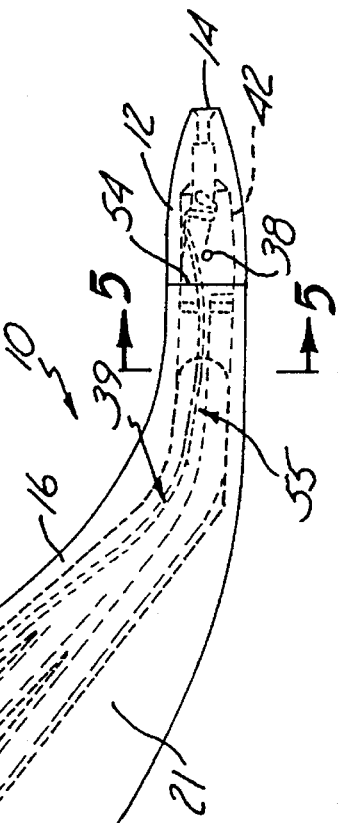

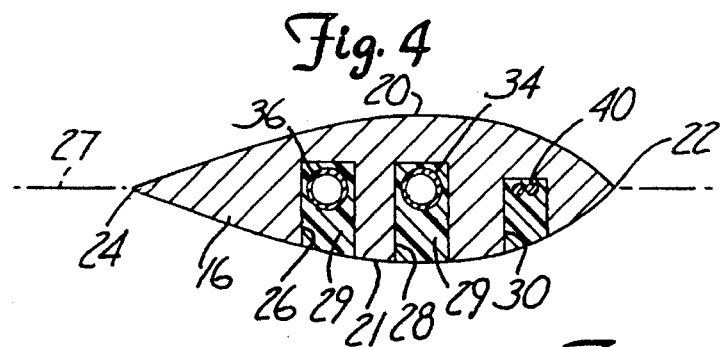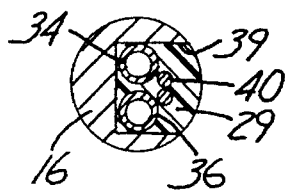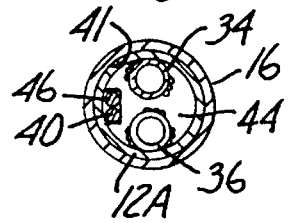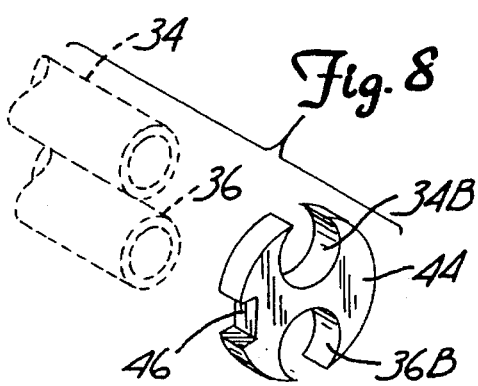

SINGLE SIDED BACKBONE STRUT FOR AIR DATA SENSOR

BACKGROUND OF THE INVENTION

The present invention relates to a low drag, light weight solid strut for supporting pitot tubes, pitot-static tubes and other air data sensing instruments, which has recesses formed into it from one side surface for pressure signal carrying conduits and heater wires. Placement of the conduits and heater wires in the side surface of the strut allows it to be made extremely thin, which significantly reduces its aerodynamic drag during use.

The struts presently used for air data sensors, such as pitot, pitot-static and angle of attack sensors are formed by spaced walls that provide an internal chamber for holding pressure signal carrying conduits leading from ports on the sensor. Heaters are generally brazed to the inner walls of the prior art struts, or are brazed into external cast-in grooves. The spaced walls and the conduits and heaters that are used result in prior art struts having a large cross-sectional shape, which has considerable aerodynamic drag.

The present invention provides minimum strut thickness and thus low drag while maintaining structural integrity. Further, the present invention simplifies the manufacture of small, low drag air data sensors.

SUMMARY OF THE INVENTION

The present invention relates to a strut design that reduces the transverse width of the strut by using a solid piece of material that is cast or machined in the desired shape. One side of the strut is finished as a continuous surface to define the desired external aerodynamic strut shape. A second side of the strut has grooves formed inwardly from the surface of the second side to receive pressure signal carrying tubes or conduits leading from sensing ports on a probe held by the strut. The conduits extend out from the base of the strut for connection to fittings on the aircraft. Additionally, one or more grooves may be provided in the second side of the strut for holding heater wires for heating the sensor, or for holding a temperature sensing device. Inwardly extending groves may be placed on the first side of the strut, if they are staggered in fore and aft direction with respect to the grooves formed in the second side, to insure structural integrity.

The heater wires and the pressure signal carrying conduits are assembled to the strut by inserting them into the formed grooves in the second side of the strut. The strut supports a tubular leading end barrel to form the sensor. The leading end barrel has a port or ports that are fluidly connected to the pressure signal carrying conduits. Each conduit is connected to its respective port through appropriate fittings.

The heater wires and pressure signal carrying conduits transition into appropriate internal structures in the leading end barrel that is secured in place on the outer end of the strut. The heater wires and pressure signal carrying conduits are secured into place in the grooves with a suitable potting material, such as an epoxy based, high temperature, thermally conductive adhesive. The potting material forms a smooth, continuous contoured second side surface that aerodynamically compliments the first side, which is smooth from a leading edge to a trailing edge.

The strut generally is made of metallic material, and is made so that it is thin, with no hollow interior space. The assembly of the pressure signal carrying conduits and the heater wires into the strut is completed from the second side surface, and requires no threading of components through an internal chamber as is the case with some prior art designs. Thus, assembly of sensors in accordance with the present invention is easily done, and with reduced amounts of labor. When epoxy is used as the potting material, its application is relatively quick, and it can be easily automated.

The cross-sectional shape of the struts of the present invention can be modified to minimize their drag. For example, airfoil shapes that have a mean line which coincides with the chord of the airfoil, but having a maximum thickness forward of the chord midpoint, and with a rounded leading and sharp trailing edge can be provided. Preferably, the maximum thickness of the strut is at approximately 15% to 45% of the chord rearwardly of the leading end. Alternate designs, using cambered, airfoil shaped struts are also contemplated by the present invention.

The grooves in the strut can be formed by casting or machining, which produces reliable and accurately dimensioned passageways. Accordingly, the heater wires are always placed in exactly the same location in each sensor, reducing variations in the effectiveness of the heaters during use, and also simplifying assembly.

Epoxy based potting materials or adhesives are preferred in the practice of the invention because they are resistant to corrosion problems which can occur with some brazed structures, and the assembly is not subject to high temperatures associated with brazing, which sometimes warp the strut. Labor is therefore saved because of the elimination of the need for straightening heat warped struts. Furthermore, since brazing can be eliminated, materials such as aluminum and composites may be used for the strut and sensor. These materials are lighter, less expensive, easier to fabricate and have better thermal conductivity than the beryllium copper alloys of the prior art.

The thinner, solid cross-section of the strut has very good thermal conductivity so that it will deice faster and resist icing better when the heaters are operating.

BRIEF DESCRIPTION OF THE DRAWINGS

FIG. 1 is a side view of an air data sensor having a strut made according to the present invention;

FIG. 2 is a plan view of the air data sensor of FIG. 1;

FIG. 3 is a front elevational view of the air data sensor of FIG. 1;

FIG. 4 is a sectional view taken as on line 4—4 in FIG. 1;

FIG. 5 is a sectional view taken as on line 5—5 in FIG. 1;

FIG. 6 is a fragmentary enlarged view of a leading end of the air data sensor shown in FIG. 1 with parts in section and parts broken away;

FIG. 7 is a sectional view taken on line 7—7 in FIG. 6; and

FIG. 8 is an exploded perspective view illustrating a support for pressure signal carrying conduits and heater wires used in the leading end of the sensor of FIG. 1.

DETAILED DESCRIPTION OF THE PREFERRED EMBODIMENTS

An air data sensor indicated generally at 10 as shown comprises a pitot-static tube, which has a tubular leading end barrel portion 12 having a forwardly facing pitot port 14.

The leading end barrel portion 12 is supported on an outer end of a strut 16 made according to the present invention. The leading end barrel portion 12 has a central axis that is parallel to the fluid flow direction.

The strut 16 has a base plate 18 mounted thereon with screws that thread into the base of the strut 16. The base plate 18 configured to support the air data sensor 10 relative to the surface of an air vehicle (not shown) in a normal manner.

The strut 16 is made from a solid block of material, as can be seen in FIG. 4, and has a generally airfoil cross-sectional shape with a smooth, continuous side surface 20 on a first side thereof, as seen in FIG. 4. The strut has a rounded leading edge 22 and a sharp trailing edge 24. The mean line or center plane 27 of strut 16 coincides with the chord of the airfoil cross-section, as shown in FIG. 4. The maximum thickness of the cross-section is preferably in a range from 15% to 45% of the chord, and most preferably approximately 30% of the chord rearwardly.

The strut 16 is also curved forwardly from the base 18 to the barrel portion 12. As shown, there are three grooves 26, 28 and 30 that extend inwardly from the surface of second side 21. The grooves 26 and 28 are of size to receive pressure signal carrying conduits 34 and 36. The conduit 34 carries pressure signals from the pitot port 14, and the conduit 34 opens to a chamber 42 in the interior of the leading end barrel portion 12. A static sensing port 38 shown in FIG. 1 opens to the chamber 42 and thus the conduit 36 carries the static pressure signal from chamber 42. The groove 30 is made for receiving a suitable resistance heater wire 40.

The three grooves merge together about one-half of the way from the base 18 to the leading end barrel portion 12. The merged grooves form one channel 39 into which both conduits 34 and 36 fit, along with the heater wire 40. The channel 39 ends near the junction of the strut and leading end barrel portion 12. A short bore 41 in the outer end of the strut connects to the channel 39 and to the tubular interior of leading end barrel portion 12.

The strut 16 can be machined from a solid block of material, generally a metal, or it can be cast, and if not formed during casting, the grooves, 26, 28 and 30 and the channel 39 are machined in a predetermined pattern for receiving preformed conduits 34 and 36 and the heater wire 40.

As can be seen in FIG. 6, the leading end barrel portion 12 of the air data sensor has a neck 12A that fits within a counter bore at the outer end of bore 41 of the strut 16. The two parts can be held together in a desired manner, for example with adhesive, or if metal, by brazing, which is localized and does not cause warpage.

The conduit 34 may be placed in the groove 28 with an end extending through bore 41 prior to the assembly of the leading end barrel portion 12 onto the strut. An end portion 34A of conduit 34 sealingly fits into a bore in the leading end of end barrel portion 12 and opens to the pitot port 14 when assembly is complete. A static port 38 also is provided in the leading end barrel portion 12. Port 38 is shown in FIG. 6 as well. The static port 38 is open to chamber 42. The conduit 36 is placed in the groove 26 with one end extending out of the bore 41 so it opens to chamber 42 after the leading end barrel portion is assembled. The material in channel 39 insures that the conduit 36 is sealed suitably so it carries the static pressure signal present in chamber 42.

A support bulkhead 44 is used in the barrel, as shown in FIG. 8, and has cylindrical apertures 34B and 36B for receiving and supporting the conduits 34 and 36, respectively. The bulkhead provides support for the conduits in the leading end barrel portion 12. The bulkhead 44 also has a notch 46 for supporting the resistance heater wire 40. As can be seen the heater wire 40 passes into the chamber 42 and is wrapped around the end portion of the conduit 34 to deice the conduit, as well as the leading end barrel portion 12 in order to prevent the ports 14 and 38 and the conduits from freezing closed during use. The bulkhead can be merely slipped into place and secured suitably in the leading end barrel portion.

The single large channel 39 which extends from the merge region of grooves 26, 28 and 30 to the leading end barrel portion 12 accommodates both conduits 34 and 36 and the heater wire 40.

The channel 39 terminates at an end portion 55, which is adjacent to the junction line 54 between the leading end barrel portion 12 and the strut 16. The strut is provided with bore 41 that joins the end portion 55 of channel 39, and accommodates both conduits 34 and 36 and the heater wire 40, so they can pass into the interior of the tubular leading end barrel portion 12 and the chamber 42.

The conduits 34 and 36 and the heater wire 40 are secured and sealed in their respective grooves and in channel 39 with a suitable potting material or hardenable adhesive shown at 29, such as an epoxy based adhesive that is thermally conductive and relatively rapid setting. The conduits 34 and 36 are pre-formed to their desired shape, including the necessary bends for curving from the leading end barrel portion 12 to the base 18, and have bend portions where they extend through the base 18. The openings for the conduits 34 and 36 in base 18 are counter bored for adequate clearance for the conduits.

The conduits and heater wire can be placed into the respective grooves and joined in the channel 39, and will extend through bore 41 as a first step of assembly. The heater wire 40 is wrapped around the pitot pressure signal carrying conduit 34. The heater wire and conduits are supported on the bulkhead 44 and may be held by a potting material or adhesive, such as an epoxy indicated at 58 in FIG. 6. The leading end barrel portion 12 can be slid into place after partial assembly of the strut with the neck 12A fitting into the bore 41 in the end of the strut. The conduit end 34A is slid into the provided bore on the interior of the leading end barrel portion 12. A suitable sealant can be used on the end portion 34A of the conduit 34 during assembly if desired.

The conduits and the heater wire are adhesively secured in their respective grooves from the second side of the strut with heat conductive potting material 29, usually a settable liquid epoxy. Once the potting material 29 is set, the outer strut surface of side 21, opposite the surface of side 20 can be easily sanded, or otherwise abraded to remove excess potting material and form the finished surface to continue the contour of the machined portions of the surface of side 21. The material used for securing the conduits and heater, such as epoxy, bonds to the surfaces of the strut defining the grooves and add strength and bending resistance in two axes. The conduits are integrated into the strut structure by the securing material to also add strength to the thin strut.

The base 18 can be secured to the strut after this assembly has taken place, and the entire air data sensor is then ready for mounting to an air vehicle for use. Suitable connectors of course would be used on the pressure signal carrying conduits for connecting them to existing sensors in an air vehicle.

The assembly of the air data sensor is relatively easy because the conduits can be pre-formed and easily inserted, since the strut 16 is made of a solid block of material with the grooves made from only one side. The use of epoxy potting material does not require high heat, so warpage is not a factor. The leading end barrel portion 12 can be adhesively secured into place. If the leading end barrel portion is adhesively secured, no brazing is necessary along the strut 16, and the strut material can be selected from a wide variety of light weight, high strength, easily machined materials including composites, aluminum alloys and titanium alloys. The material selection is no longer restricted to a material that brazes well and has high strength, such as beryllium copper alloys currently in use today.

The hollow construction is eliminated, so the width between the side surfaces 20 and 21 can be reduced to a minimum. In actual practice, for example, where conduits approximately ⅛ of an inch outside diameter are used, the overall thickness of the strut can be made as thin as less than ¼ of an inch.

As noted above, the placement of the heaters and the pressure signal conduits require nothing more than placing them in the grooves and then slipping on the leading end barrel portion 12.

FIG. 4 illustrates a suitable airfoil cross-sectional shape which can be used for the strut. Also as shown in FIG. 1, the leading edge of the strut curves from its outer end inwardly toward the base, in an aerodynamically effective configuration. The strut blends into the cylindrical leading end barrel section, as can be seen. The strut configuration can be symmetrical relative to a bisecting plane centered on the axis of the pitot port, or the strut may be offset laterally from the leading end barrel portion 12. In other words, the symmetrical relationship shown in FIG. 3 is not essential.

The strut of the present invention can be made much thinner than existing struts and does not have a hollow interior. Weight is reduced significantly, on the order of a third or more, and the drag numbers at transonic speeds can be reduced up to approximately 50% from a traditional strut. The solid block of material forming the strut permits reducing the size because there is no need for having walls that have long formed recess for receiving heaters, or walls that are spaced apart for forming a full length chamber for receiving the pressure signal carrying conduits.

The heater wire in the strut of the present invention is near the mid portion of the strut so heat is transferred substantially evenly to both sides of the strut for deicing with efficient utilization of heaters.

Although the present invention has been described with reference to preferred embodiments, workers skilled in the art will recognize that changes may be made in form and detail without departing from the spirit and scope of the invention.

What is claimed is:

1. A solid strut for an air data sensor having a desired cross-sectional shape, a base end and an outer end;

the strut having a first side extending from the base end to the outer end, the first side having a surface contoured smoothly to said desired shape from a leading edge to a trailing edge;

said strut having a second side extending from the base end to the outer end and extending from the leading edge to the trailing edge and having a plurality of spaced apart grooves adjacent the base end with separate elongated members in the grooves, and said plurality of grooves merging into a single channel adjacent the outer end, said single channel being of size to receive elongated members from the grooves; and a retaining material filling the grooves and securing the conduit in the grooves.

2. The strut of claim 1, wherein the second side having the plurality of grooves has a desired smooth contoured surface after the conduit is secured in place.

3. The strut of claim 2, and an elongated heater secured in a second groove extending along said strut.

4. The strut of claim 1, wherein the cross-sectional shape of the strut comprises a generally airfoil shape having a mean line of the strut along a chord of the airfoil shape, and a maximum thickness of the strut being in the range of 15% to 45% of the chord.

5. The strut of claim 1, wherein the outer end of the strut merges into a generally cylindrical barrel portion, and an internal bore through at least a part of the outer end of the strut, the channel opening to the bore.

6. The strut of claim 1, wherein the plurality of grooves includes three grooves formed in the second side of the strut adjacent the base, two of the grooves holding pressure signal carrying conduits and the third groove being of size to receive a heater wire.

7. The strut of claim 1, wherein the retaining material comprises an epoxy.

8. An air data sensor for sensing a pressure at an external port on the sensor comprising a strut having a solid cross-section for extending into a fluid flowing relative to the strut, a plurality of grooves extending inwardly laterally of the strut from one side surface thereof only, each of said grooves receiving an elongated conduit for the air data sensor that extends along a length of the strut, the sensor having a leading end portion having an axis facing generally in the direction of fluid flow, and having pressure sensing ports for providing separate pressure signals to each of the elongated conduits, and a material filling the grooves to secure the conduits in the grooves.

9. The air data sensor of claim 8, wherein the sensor includes a heater wire, said strut having a second groove for receiving the heater wire formed inwardly into the strut from the same side of the strut as the first mentioned groove, said heater wire being imbedded in a thermally conductive material for securing the wire in the strut for heating the air data sensor.

10. The air data sensor of claim 8, wherein said leading end portion defines an interior chamber, and a bore opening to the grooves of the strut and opening to the chamber, said chamber having at least one side wall port therethrough to provide a pressure signal in the chamber, and at least one conduit being open to the chamber.

11. The air data sensor of claim 9, wherein said strut has a general center plane positioned midway laterally between opposite sides, and said heater wire being positioned to be generally adjacent the center plane to provide substantially equal length heat paths from the heater wire to the opposite sides of the strut.

12. A method for making an air data sensor comprising the steps of:

forming a solid strut having a desired cross-sectional shape and a base end and outer end;

providing a plurality of grooves in the solid strut adjacent the base end extending along the length of the strut toward the outer end and of a size to receive an elongated member;

merging the plurality of grooves into a single channel at the outer end;

positioning elongated members in the grooves and in the channel and securing the elongated members in place; and finishing the strut to a desired aerodynamic contour.

13. The method of claim 12 including the step of providing at least one elongated member comprising a pressure signal carrying conduit, and coupling the conduit to a pressure sensing port on the sensor.

14. The method of claim 12 including the step of providing a leading end barrel at the outer end of the strut and securing the barrel in position to open to the channel formed in the outer end of the strut, and passing at least one elongated member from a groove through the channel and into an interior of the barrel.

15. The method of claim 14, and further providing at least three grooves in the strut adjacent the base, all grooves extending inwardly from the same side of the strut and merging into the channel, placing separated elongated members into the grooves, including separate conduits in two of the grooves and a heater in a third groove, and extending the conduits and heater through the channel into the interior of the barrel.

16. A solid strut for an air data sensor having a desired cross-sectional shape, a base and an outer end;

the strut having a first side extending from the base end to the outer end, the first side having a surface contoured smoothly to said desired shape from a leading edge to a trailing edge;

said strut having a second side extending from the base end to the outer end and extending from the leading edge to the trailing edge and having a plurality of spaced apart grooves adjacent the base and with separate elongated members in the grooves, and said grooves merging into a single channel adjacent the outer end, said single channel being of size to receive a conduit from at least one of the grooves and a heater in a second groove; and a retaining material filling the grooves and securing the conduit in the grooves.

17. The strut of claim 16 wherein the second side having the plurality of grooves has a desired smooth contoured surface after the conduit is secured in place.

18. The strut of claim 16, wherein the cross-sectional shape of the strut comprises a generally airfoil shape having a mean line of the strut along a chord of the airfoil shape, and a maximum thickness of the strut being in the range of 15% to 45% of the chord.

19. The strut of claim 16, wherein the outer end of the strut merges into a generally cylindrical barrel portion, and an internal bore through at least a part of the outer end of the strut, the channel opening to the bore.

20. The strut of claim 16, wherein the plurality of grooves includes three grooves formed in the second side of the strut adjacent the base, two of the grooves holding pressure signal carrying conduits and the third groove being of size to receive a heater wire.

21. The strut of claim 16, wherein the retaining material comprises an epoxy.

* * * * *